April 16, 1968   R. P. RHODES   3,378,619
SEAL DESIGN FOR ELECTRIC FURNACE
Filed Oct. 2, 1967   2 Sheets-Sheet 1

R. P. RHODES   INVENTOR

BY W. O. T. Heilman

PATENT ATTORNEY

April 16, 1968   R. P. RHODES   3,378,619
SEAL DESIGN FOR ELECTRIC FURNACE
Filed Oct. 2, 1967   2 Sheets-Sheet R. P. RHODES   INVENTOR
BY W. O. Heilman

PATENT ATTORNEY

United States Patent Office 3,378,619
Patented Apr. 16, 1968

3,378,619
SEAL DESIGN FOR ELECTRIC FURNACE
Richard P. Rhodes, Roselle, N.J., assignor to Esso Research and Engineering Company, a corporation of Delaware
Filed Oct. 2, 1967, Ser. No. 672,237
3 Claims. (Cl. 13—9)

ABSTRACT OF THE DISCLOSURE

The present invention is concerned with an improved seal design assembly for an electric furnace employed in the distillation of metals, especially at atmospheric pressures. It is more particularly concerned with the use of seals or closures wherein a gradient of the axial wall temperature is maintained in the seal or closure together with a flow of low density gas in the direction of the temperature gradient in order to control the refluxing metal level and thus secure a more effective high temperature metal distillation operation, and also to prevent the destruction of the seal material.

---

It is well known in the art to utilize electric furnaces for various purposes particularly for the distillation of metals. In these high temperature furnaces satisfactory heat input is controlled by positioning electrodes a predetermined depth within or against a conductive phase maintained in the bottom of the furnace. Thus, in order to control the temperature it is necessary to have vertically movable electrodes which can be positioned in the furnace at any predetermined desired depth. Also, in the distillation of metals in the electric furnace, particular care is needed to exclude air from the system in order to obtain high yields. Thus it is very essential that the seals about the electrodes be such that the electrodes can be moved and adjusted without the introduction of any extraneous air into the system. Also, in addition to electrode seals it is necessary that an airtight closure be maintained on any feed port or pyrometer view port. However, due to the temperatures required for the distillation of metals especially at about atmospheric pressures, which temperatures are above about 2500° F. such as about 3000° F., it is necessary to utilize special furnace construction in order to avoid the destruction of the seals. The seal assembly of the present invention is equally applicable to feed and view ports where it is necessary to maintain a furnace opening in the pressure of a volatile metal without the introduction of air.

In accordance with the present apparatus a novel concept in seals is utilized which comprises the combination of a graded wall temperature with the use of a low density balancing gas. The feed port or electrode seal is built with a high thermal conductivity wall of such length that the full temperature range of melting and boiling point of the metal being distilled is spanned. The conductivity of the wall must be such that the heat of condensation of the metal being distilled is removed. A low density gas as, for example, helium or hydrogen, is passed over the wall in the direction of the temperature gradient in order to maintain the proper level of reflux. While the present invention may be utilized with respect to any electric arc furnace, it is particularly desirable for utilization in the distillation of metals, especially magnesium.

Figure 1:
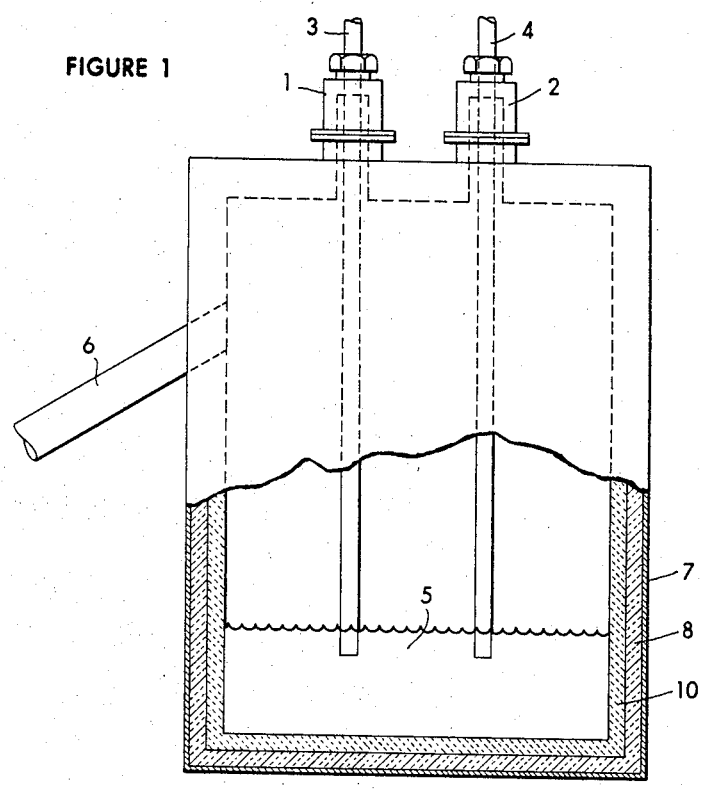

The present invention may be readily understood by reference to the figures which describe the apparatus in conjunction with the production of magnesium. Referring specifically to FIGURE 1, a graphite cylindrical crucible element 10 has two vertical projecting cylindrical seal elements 1 and 2. It is preferred that these projecting cylindrical seal elements be integral with the basic element 10 and also comprise graphite. Two electrodes 3 and 4 extend downwardly through the seals and packing into a slag or other conducting phase 5 in the bottom of the furnace. Details of the cylindrical elements 1 and 2, as well as the method by which electrodes 3 and 4 are extended therethrough will be more specifically described in FIGURE 2. Temperature and pressures are maintained so that vaporous magnesium distills upwardly from the slag phase 5. The magnesium is condensed in a suitable condenser element 6 and is removed from the system by any suitable conventional means. The temperature of the slag phase 5 is in the range from about 2500° to 3500° F. such as about 3000° F. The pressure is in the range from about 0.8 to 1.2 atmosphere such as about 1.0 atmosphere. The temperature at the top of crucible 10, below elements 1 and 2 is also about 3000° F. At any rate the temperatures at the lower ends of elements 1 and 2 must exceed the boiling point of the metal being distilled, such as magnesium.

The basic electric arc furnace 10 is a conventional one in that there is an outer steel shell 7 which contains insulation 8 positioned between the graphite crucible 10 and the outer steel shell 7. The entire unit further may be suitably insulated and supported by any means such as with fire brick and the like. Suitable means are provided for introducing the feed materials into the furnace. The slag may be produced by the technique described in copending application Ser. No. 634,982 filed May 1, 1967, Richard P. Rhodes and Julian M. Avery, entitled "Thermal Process for the Production of Magnesium." The condenser element 6 may be of the suitable type.

Figure 2:
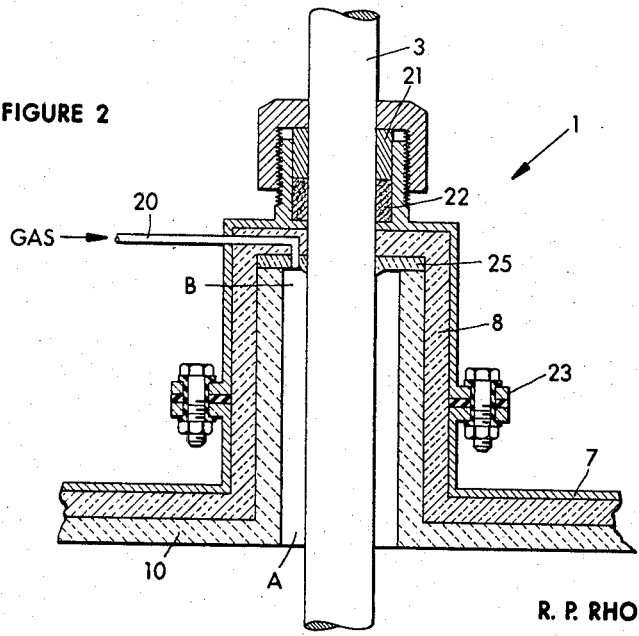

Referring specifically to FIGURE 2 which describes in detail the construction of element 1 which element is entirely similar to the construction of element 2, these seal assemblies 1 and 2 are maintained primarily for use on an electric arc furnace containing vapors of a substance volatile only at high temperatures as, for example, in the range above about 2500° F. The seal assemblies are particularly for use where the volatile substance is a metal and, therefore, conductive wherein the electrodes must be movable and sealed into the furnace or enclosure. The seal assemblies which function to contain metal vapor at pressures of approximately 1 atmosphere are subjected to particularly severe environmental operating conditions which tend to detroy the packing. All points within the seal in contact with the metal vapor will tend to attain at least the condensing temperature of the vapor in the furnace at the pressure of the furnace. Thus, when the metal is vaporous magnesium at one atmosphere pressure, the temperature will be about 2100° F. Air must be completely excluded to avoid the possibility of a metal fire and also to avoid blockage of the passageway caused by oxide or nitride dust formed by combustion. If the seal assembly is to be used as an electrode, additional restrictions of electrical insulation and movement may also be imposed. Electrode 3 is sealed through furnace shell 7 and the inner refractory graphite wall 10. The inner refractory wall 10 is externally covered by suitable insulation 8 of such thickness that the temperature at point A is at or above the condensation temperature of the furnace vapor at the pressure of the furnace. Similarly, the temperature at point B must be below the condensation temperature, preferably by an amount such that the vapor pressure of the condensing metal is negligible.

A gas of a lower density than the metal vapor is fed into the top of the seal assembly by means of line 20 so that a zone reflux is maintained below the middle of the seal in the annular area between electrode 3 and graphite wall 10. The gap between the electrode 3 and the seal wall 10 must be such that the refluxing metal can easily flow back into the furnace without bridging. Suitable low density gases are hydrogen, helium and/or neon. The length of the refluxing area when utilizing magnesium is preferably in the range of from 1 ft. to 4 ft. such as about 2 ft. A packing gland 21 and packing material 22 is provided on the outside of the shell as shown so as to exclude air. An insulated flange 23 is also provided so that the seal can be disassembled and also to prevent a continuous electrical path from being formed between the electrodes. The functioning of the seal is as follows. Metal vapor tends to pass upwardly in the area between electrode 3 and refractory wall 10. However, the vapor encounters the lower temperature of seal wall 10 and begins to condense under the atmosphere of the low density gas, thus maintaining the reflux level at a fixed point. This prevents diffusion of the vapors into the cold upper zone of the seal. An insulating cover plate 25 is also provided in the seal to retard any passage of small amounts of vapor out into the insulation.

Figure 3:
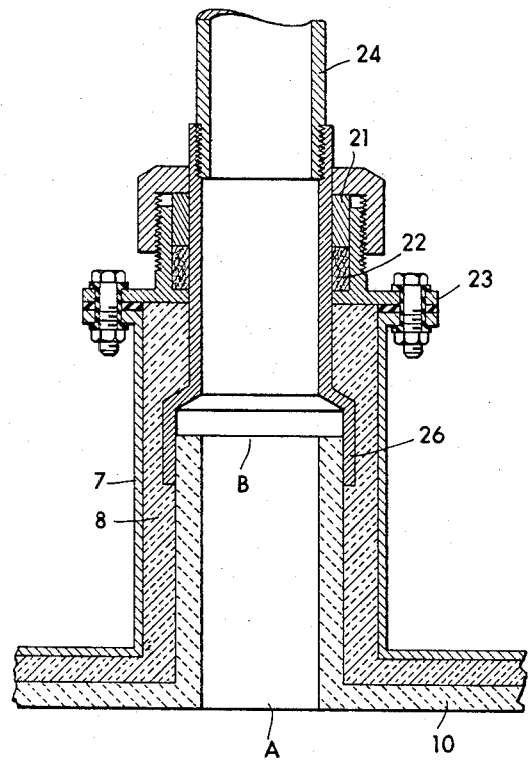

The principle utilized in the electrode seals can equally well be applied to the feed system as shown in FIGURE 3. A temperature gradient is maintained between the upper and lower seal wall 10 (points B and A) in a manner similar to that employed with the electrode seals. A slip coupling 26 and packing gland 22 and packing 21 are provided to permit expansion of the seal without the buildup of undue stress. A feed pipe 24 connects with a conventional purged feed hopper, and also carries a slow flow of low density gas down into the seal. The mode of reflux of metal in the seal is the same as that described in the example of the electrode seals.

The seal or closure disclosed in this invention secures a vertical temperature gradient imposed over a temperature range spanning the boiling point of the volatile material at the pressure of the furnace. There also exists a restricted opening to retard diffusion and to increase gas velocity. Also, a downward flow of gas of lower density than the metal vapor and of sufficient velocity to overcome upward diffusion of the metal vapor is secured which stabilizes the reflux zone.

The measurements of the furnace and seal may be varied widely depending upon operating factors. For example, a typical furnace may be circular and have a diameter in the range from about 10 to 20 feet, such as about 15 feet. The height of the furnace may be in the range from about 10 feet to 20 feet as, for example, about 15 feet. The height of the seal assemblies extending above the top of the furnace may be in the range from about 2 feet to 4 feet such as about 3 feet. These elements may be circular and have diameters which depend upon other factors such as the diameters of the electrodes. The diameters of the electrodes may vary from about 6 inches to 18 inches as, for example, about 12 inches. Thus, the diameters of the seal assemblies are such as to provide an annular space about the electrodes of from about 1 inch to 4 inches, such as about 2 inches.

What is claimed is:

1. Electric furnace assembly for the distillation of metals which comprises in combination, (1) a furnace suitably insulated having a top, sides and a bottom, (2) a metal slage phase positioned along the bottom of said furnace, (3) two hollow projections extending from the top of said furnace the lower ends of which are in open communication with the interior of said furnace, (4) two electrodes extending from without said projections through said projections, and through said furnace into said slag phase, (5) annular areas between said electrodes and the inner surfaces of said projections, (6) packing material positioned between said electrodes and said projections at the upper ends of said projections, (7) means for imparting an electric current between said electrodes, (8) means for raising and lowering said electrodes through said packing material, (9) condenser means for withdrawing vaporous metal from the side of said furnace, and (10) means for introducing an inert gas at the upper ends of said annular areas.

2. Assembly as defined by claim 1 wherein the electric current imparted between said electrodes is sufficient to distill metal from said slag and wherein the length of said projections is sufficient that at the lower end of said annular space said metal is in the vaporous phase and wherein at the top of said annular space said metal will be fully condensed.

3. Electric furnace assembly for the distillation of magnesium which comprises in combination, (1) a furnace suitably insulated having a top, sides and a bottom, (2) a magnesium slag phase positioned along the bottom of said furnace, (3) two hollow projections extending from the top of said furnace, the lower ends of which are in open communication with the interior of said furnace, (4) two electrodes extending from without said projections through said projections, through said furnace into said slag phase, (5) annular areas between said electrodes and the inner surfaces of said projections, (6) packing material positioned between said electrodes and said projections at the upper ends of said projections, (7) means for imparting an electric current between said electrodes to secure a temperature in said slag phase of about 3000° F., (8) means for raising and lowering said electrodes through said packing material, (9) means for withdrawing vaporous metal from the side of said furnace, and (10) means for introducing an inert gas at the upper end of said annular areas in an amount to have a temperature at the bottom of said annular area at about 2100° F. and at the top of said annular area at about 1000° F.

References Cited
UNITED STATES PATENTS

| | | | |
|---|---|---|---|
| 871,338 | 11/1907 | Heroult | 13—18 |
| 1,732,431 | 10/1929 | Bruggmann | 13—17 |
| 908,407 | 12/1908 | Heroult | 13—17 X |
| 1,542,716 | 6/1925 | Payne | 13—6 |

BERNARD A. GILHEANY, *Primary Examiner.*

H. B. GILSON, *Assistant Examiner.*